US012458339B2

(12) United States Patent
Housman (10) Patent No.: US 12,458,339 B2
(45) Date of Patent: Nov. 4, 2025

(54) TISSUE REPAIR SYSTEMS AND METHODS OF ASSEMBLY

(71) Applicants: Smith & Nephew, Inc., Memphis, TN (US); Smith & Nephew Orthopaedics AG, Zug (CH); Smith & Nephew Asia Pacific Pte. Limited, Singapore (SG)

(72) Inventor: Mark E. Housman, North Attleboro, MA (US)

(73) Assignees: Smith & Nephew, Inc., Memphis, TN (US); Smith & Nephew Orthopaedics AG, Zug (CH); Smith & Nephew Asia Pacific Pte. Limited, Singapore (SG)

( * ) Notice: Subject to any disclaimer, the term of this patent is extended or adjusted under 35 U.S.C. 154(b) by 323 days.

(21) Appl. No.: 18/030,141

(22) PCT Filed: Oct. 25, 2021

(86) PCT No.: PCT/US2021/056480
§ 371 (c)(1),
(2) Date: Apr. 4, 2023

(87) PCT Pub. No.: WO2022/093706
PCT Pub. Date: May 5, 2022

(65) Prior Publication Data
US 2023/0363754 A1    Nov. 16, 2023

Related U.S. Application Data

(60) Provisional application No. 63/105,654, filed on Oct. 26, 2020, provisional application No. 63/105,646, filed on Oct. 26, 2020.

(51) Int. Cl.
*A61B 17/04* (2006.01)

(52) U.S. Cl.
CPC .. *A61B 17/0401* (2013.01); *A61B 2017/0409* (2013.01); *A61B 2017/0441* (2013.01); *A61B 2017/0445* (2013.01); *A61B 2017/0448* (2013.01)

(58) Field of Classification Search
CPC .... A61B 2017/0409; A61B 2017/0445; A61B 2017/0458; A61B 2017/0441
See application file for complete search history.

(56) References Cited

U.S. PATENT DOCUMENTS

| | | | | |
|---|---|---|---|---|
| 5,055,104 | A * | 10/1991 | Ray | A61F 2/446 606/247 |
| 5,695,497 | A * | 12/1997 | Stahelin | F16B 23/0007 606/104 |
| 6,503,251 | B1 * | 1/2003 | Shadduck | A61B 17/0401 606/232 |
| 8,277,484 | B2 | 10/2012 | Barbieri et al. | |

(Continued)

FOREIGN PATENT DOCUMENTS

AU    2014353044 A1    6/2016

*Primary Examiner* — Alexander J Orkin
(74) *Attorney, Agent, or Firm* — ArentFox Schiff LLP; Joseph M. Maraia; Marlo S. Grolnic (57) ABSTRACT

Tissue repair systems include suture anchors comprising a distal transfer eyelet. The use of transfer eyelet in various anchor configurations enables diameter reduction of the anchor, as well as enlargement of the driver cannulation. This in turn increases the amount and size of suture loadable into the system.

6 Claims, 11 Drawing Sheets

(56) References Cited

U.S. PATENT DOCUMENTS

| | | | |
|---|---|---|---|
| 9,393,006 B2* | 7/2016 | Housman | A61B 17/861 |
| 2003/0065361 A1* | 4/2003 | Dreyfuss | A61B 17/0401 |
| | | | 606/232 |
| 2004/0106950 A1* | 6/2004 | Grafton | A61B 17/0401 |
| | | | 606/232 |
| 2005/0283158 A1* | 12/2005 | West, Jr. | A61B 17/863 |
| | | | 606/907 |
| 2006/0100627 A1* | 5/2006 | Stone | A61F 2/0805 |
| | | | 606/907 |
| 2006/0276841 A1* | 12/2006 | Barbieri | A61B 17/0401 |
| | | | 606/232 |
| 2007/0060922 A1* | 3/2007 | Dreyfuss | A61B 17/0401 |
| | | | 606/326 |
| 2007/0225719 A1* | 9/2007 | Stone | A61B 17/0642 |
| | | | 606/232 |
| 2009/0118776 A1* | 5/2009 | Kelsch | A61B 17/8645 |
| | | | 606/325 |
| 2009/0319043 A1* | 12/2009 | McDevitt | A61B 17/8886 |
| | | | 623/13.14 |
| 2010/0292733 A1* | 11/2010 | Hendricksen | A61B 17/0401 |
| | | | 606/232 |
| 2011/0112576 A1* | 5/2011 | Nguyen | A61B 17/0401 |
| | | | 606/232 |
| 2012/0179163 A1* | 7/2012 | Housman | A61B 17/8888 |
| | | | 606/104 |
| 2013/0103054 A1* | 4/2013 | Housman | A61B 17/0401 |
| | | | 606/139 |
| 2013/0158599 A1* | 6/2013 | Hester | A61B 17/0401 |
| | | | 606/232 |
| 2013/0178901 A1* | 7/2013 | Arai | A61F 2/0805 |
| | | | 606/233 |
| 2014/0277130 A1* | 9/2014 | Housman | A61B 17/8877 |
| | | | 606/232 |
| 2014/0364862 A1* | 12/2014 | Bennett | A61B 17/0482 |
| | | | 606/232 |
| 2015/0245901 A1* | 9/2015 | Dougherty | A61F 2/0805 |
| | | | 606/232 |
| 2018/0256148 A1* | 9/2018 | Miller | A61B 17/0401 |
| 2018/0256150 A1* | 9/2018 | Gustafson | A61B 17/0469 |
| 2018/0263617 A1 | 9/2018 | Feezor et al. | |
| 2019/0261974 A1 | 8/2019 | Arai et al. | |

* cited by examiner

FIG. 11C

TISSUE REPAIR SYSTEMS AND METHODS OF ASSEMBLY

CROSS-REFERENCE TO RELATED APPLICATIONS

This application is the U.S. national phase entry under 35 U.S.C. § 371 of International Application No. PCT/US2021/056480, filed Oct. 25, 2021, entitled TISSUE REPAIR SYSTEMS AND METHODS OF ASSEMBLY, which in turn claims priority to and benefit of U.S. Provisional Application No. 63/105,646, filed Oct. 26, 2020, and U.S. Provisional Application No. 63/105,654, filed Oct. 26, 2020, the contents of which are incorporated herein by reference in their entirety for all purposes.

FIELD

The present disclosure relates to tissue repair systems and, more specifically, to tissue repair systems including anchors for attaching soft tissue to bone.

BACKGROUND

Surgical procedures, such as rotor cuff repair, generally require reattachment of soft tissue to bone. To achieve this, surgeons often place anchors in the bone and pass sutures attached to the anchor through the tissue to securely retain the tissue in place. Some procedures require placement of multiple anchors to achieve the repair.

To reduce the amount of bone stock removed by the anchors and to minimize invasiveness, surgeons generally prefer using the smallest anchors possible. Smaller anchors also allow surgeons to place more anchors and provide more points of fixation, potentially enhancing patient healing. Smaller anchors, however, result in a problematic tradeoff between a reduced interior volume of the anchor and a weakened drive support structure. To maintain structural integrity during insertion, the drive elements of the anchor must withstand the torsion required for insertion of the anchor into bone. For example, the anchor may include drive ribs within an internal volume of the anchor to provide a structural element for a driver to apply torsion during insertion. However, in smaller anchors, drive ribs of adequate depth and size to support the anchor also limit the size and amount of suture attachable to the anchor. A need therefore exists for an anchor capable of withstanding torsional drive forces during anchor insertion and yet having a sufficiently small profile to avoid occlusion of internal suture passages.

SUMMARY

Tissue repair systems and methods of assembly described herein include suture anchors comprising a distal transfer eyelet. The use of transfer eyelet in various anchor configurations enables diameter reduction of the anchor, as well as enlargement of the driver cannulation. This in turn increases the amount and size of suture loadable into the system.

Further examples of the tissue repair systems and methods of assembly of this disclosure may include one or more of the following, in any suitable combination.

In examples, tissue repair systems of this disclosure include a driver having a shaft including a distal end defining at least one groove. An anchor is engageable with the distal end of the shaft of the driver. The anchor includes an anchor body including at least one open helical coil defining an internal volume communicating with a region exterior to the at least one open helical coil through a spacing between turns of the at least one open helical coil. The internal volume is configured for insertion of the distal end of the shaft of the driver. At least one rib is disposed within the internal volume. The at least one rib is configured to engage the at least one groove of the shaft of the driver. A flexible member extends through an opening at a distal end of the anchor body and forms a loop within the interior volume. The loop is configured to be distal to the distal end of the shaft of the driver.

In further examples, the at least one rib is a single rib, and the at least one groove is a single groove. In examples, the at least one rib is connected to at least two turns of at the least one open helical coil. In examples, the loop is further configured to be coupled to at least one suture extending through the interior volume of the anchor body. In examples, the shaft defines a cannulation configured for passage of the at least one suture coupled to the loop. In examples, an outer surface of the shaft defines an aperture in communication with the cannulation such that at least one of the at least one suture is routable through the aperture. In examples, the opening at the distal end of the anchor body is defined by a support member at the distal end of the anchor body.

Other examples of the tissue repair system of this disclosure include a driver having a shaft including a distal end defining at least one groove. The shaft defines an internal cannulation extending through the shaft. A proximal portion of the cannulation has a diameter selected to be larger than a diameter of a distal portion of the cannulation. An anchor is engageable with the distal end of the shaft of the driver. The anchor has an anchor body including at least one open helical coil defining an internal volume communicating with a region exterior to the at least one open helical coil through a spacing between turns of the at least one open helical coil. The internal volume is configured for insertion of the distal end of the shaft of the driver. At least one rib is disposed within the internal volume. The at least one rib is configured to engage the at least one groove of the shaft of the driver. A flexible member extends through an opening at a distal end of the anchor body and forms a loop within the interior volume. The loop is configured to be disposed in the proximal portion of the cannulation of the shaft.

In examples, the at least one rib is two ribs, and the at least one groove is two grooves. In examples, the at least one rib is connected to at least two turns of at the least one open helical coil. In examples, the loop is further configured to be coupled to at least one suture extending through the interior volume of the anchor body. In examples, the proximal portion of the cannulation is configured for passage of the at least one suture coupled to the loop. In examples, an outer surface of the shaft defines an aperture in communication with the cannulation such that at least one of the at least one suture is routable through the aperture. In examples, the opening at the distal end of the anchor body is defined by a support member at the distal end of the anchor body.

Examples of a method of loading suture into a tissue repair system of this disclosure include passing a flexible member having a loop and limbs extending from the loop through an interior volume of an anchor, such that the loop extends from a proximal end of the anchor and the limbs extend from an opening at the distal end of the anchor. The anchor further includes an anchor body including at least one open helical coil defining the internal volume communicating with a region exterior to the at least one open helical coil through a spacing between turns of the at least one open helical coil. The internal volume is configured for insertion of the distal end of a shaft of a driver. At least one rib is disposed within the internal volume. The at least one rib is configured to engage at least one groove defined by the distal end of the shaft of the driver. The method also includes coupling at least one suture to the loop and pulling the limbs distally to draw the loop and the at least one suture into the interior volume of anchor. The method also includes tying a knot with the limbs such that the knot is prevented from passing through the opening at the distal end of the anchor.

In examples, the opening is defined by a support member at the distal end of the anchor. In examples, the method further includes passing free ends of the at least one suture through a cannulation defined by the shaft of the driver from the distal end to the proximal end of the cannulation. The distal end of the shaft is inserted into the internal volume of the anchor such that the distal end of the shaft abuts the support member and the at least one rib engages the at least one groove. In examples, passing the free ends of the at least one suture through the cannulation of the shaft includes manually loading the free ends of the at least one suture into a distal end of a cannulation. In examples, a suture passer is extended through an aperture defined in an outer surface of the shaft in communication with the cannulation. Using the suture passer, at least one of the free ends of the at least one suture is routed through the aperture to an exterior of the shaft. In examples, a suture passer is extended through the cannulation from a proximal end of the cannulation and the at least one routed free end of the at least one suture is retrieved into the cannulation of the shaft.

A reading of the following detailed description and a review of the associated drawings will make apparent the advantages of these and other features. Both the foregoing general description and the following detailed description serve as an explanation only and do not restrict aspects of the disclosure as claimed.

BRIEF DESCRIPTION OF THE DRAWINGS

Reference to the detailed description, combined with the following figures, will make the disclosure more fully understood, wherein.

DETAILED DESCRIPTION

In the following description, like components have the same reference numerals, regardless of different illustrated examples. To illustrate examples clearly and concisely, the drawings may not necessarily reflect appropriate scale and may have certain features shown in somewhat schematic form. The disclosure may describe and/or illustrate features in one example, and in the same way or in a similar way in one or more other examples, and/or combined with or instead of the features of the other examples.

In the specification and claims, for the purposes of describing and defining the invention, the terms "about" and "substantially" represent the inherent degree of uncertainty attributed to any quantitative comparison, value, measurement, or other representation. The terms "about" and "substantially" moreover represent the degree by which a quantitative representation may vary from a stated reference without resulting in a change in the basic function of the subject matter at issue. Open-ended terms, such as "comprise," "include," and/or plural forms of each, include the listed parts and can include additional parts not listed, while terms such as "and/or" include one or more of the listed parts and combinations of the listed parts.

Figure 1:
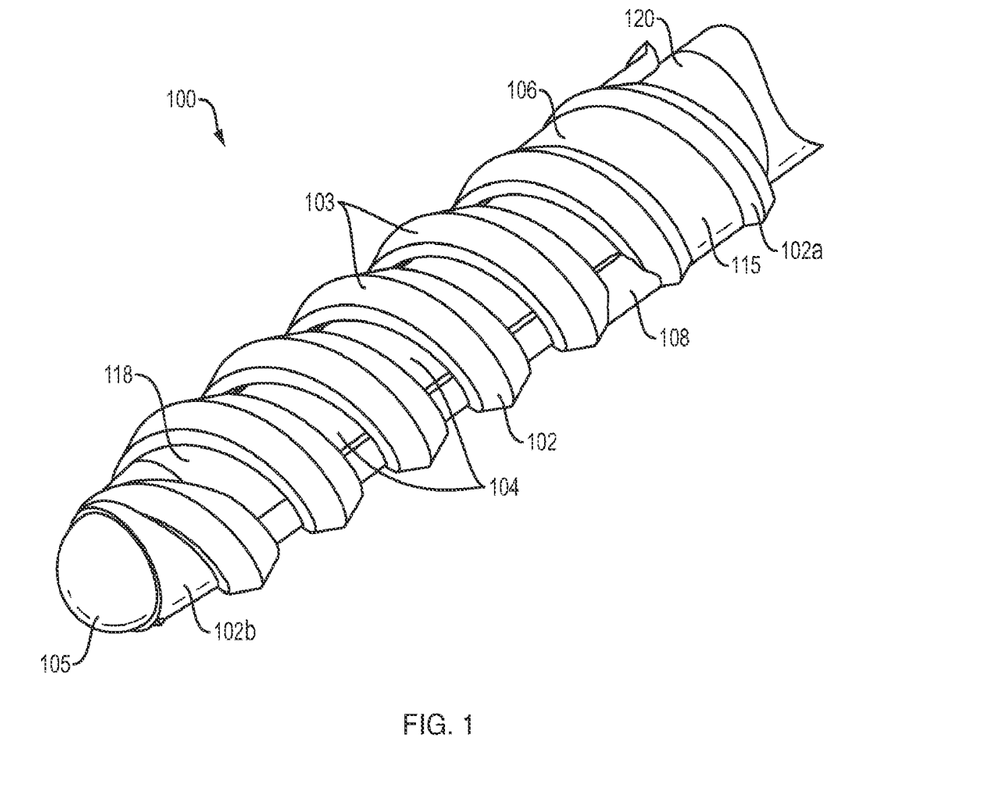
FIG. 1 shows an example of the tissue repair system of this disclosure, including an anchor, a delivery device, and a transfer eyelet, in an assembled view.

FIG. 1 shows an example of a tissue repair system 100 of this disclosure in an assembled view. The system 100 comprises an anchor 102 having a body 106 including a proximal end 102a and a distal end 102b. Most of the anchor 102 includes a screw thread 103 in the form of an open helical coil—i.e., a connected series of continuous regularly spaced turns of the thread 103 extending in a helical or spiral form substantially from the proximal end 102a to the distal end 102b with apertures 104 defined by the space between the turns of the thread 103. The body 106 of the anchor 102 defines an internal volume communicating with a region exterior to the body 106 through the apertures 104. In examples, webbing 115 may extend between any two adjacent turns of the thread 103, although the disclosure also contemplates anchors 102 without webbing. The distal end 102b also includes a transfer eyelet 105 extending through a support member 118 into the interior volume of the anchor 102. Additionally, a longitudinally extending rib 108 extends from the support member 118 along an interior surface of the thread 103, contacting at least two adjacent turns of the thread 103. In the example of FIG. 1, only a single rib 108 extends through the anchor 102. When the anchor 102 couples to the delivery device 120, the rib 108 engages with a groove of the delivery device 120, as further described below. In examples, the anchor 102 may comprise polymers (e.g., polyetheretherketone) (PEEK)), bioabsorbable materials, metals (e.g., surgical steel, titanium), or any other suitable material.

Figure 2:
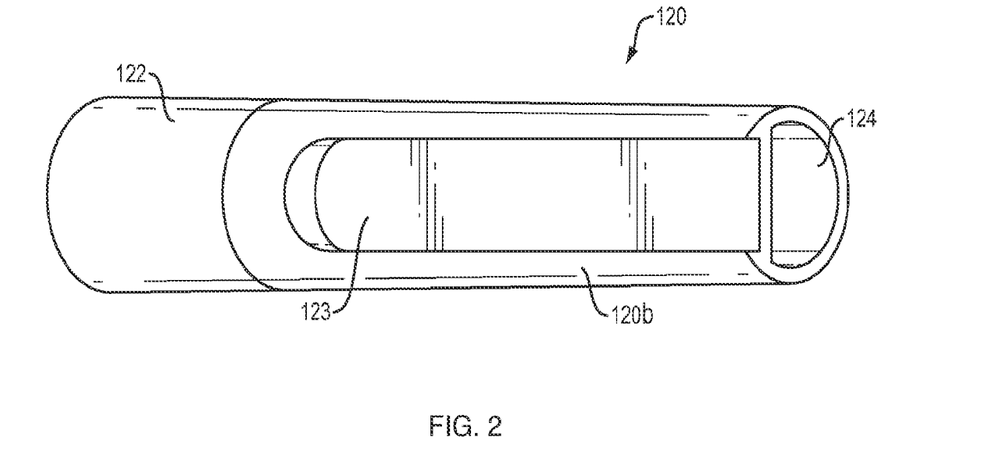
FIG. 2 shows the distal end of a shaft of the delivery device of FIG. 1.

FIG. 2 shows an example of a distal end 120b of a shaft 122 of the delivery device 120. The distal end 120b defines a groove 123 on an outer surface of the shaft 122. When inserted into the anchor 102 of FIG. 1, the rib 108 of the anchor 102 houses within the groove 123. The shaft 122 further defines a cannulation 124 such that when the anchor 102 engages the shaft 122, repair sutures attached to the anchor 102 extend through the cannulation 124.

Figure 3A:
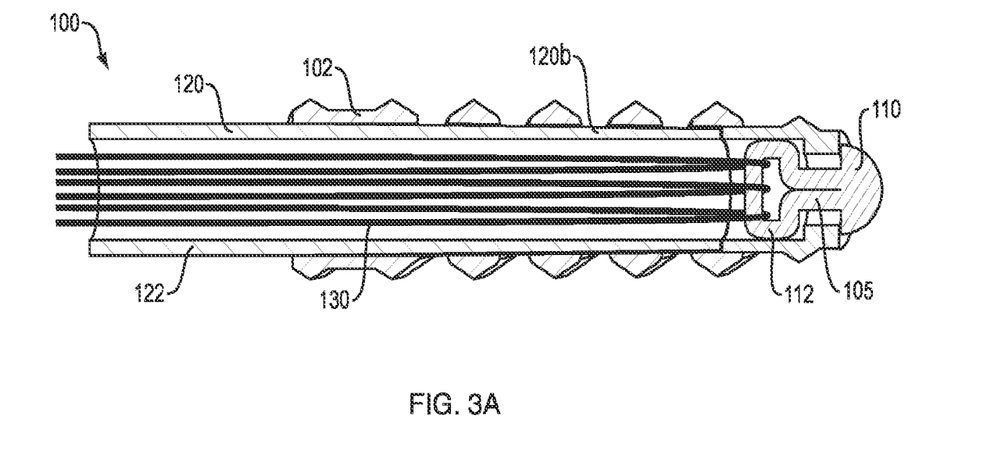
FIGS. 3A and 3B show cross-sectional views of the tissue repair system of FIG. 1 with the shaft inserted (FIG. 3A) and the shaft removed (FIG. 3B)
Figure 3B:
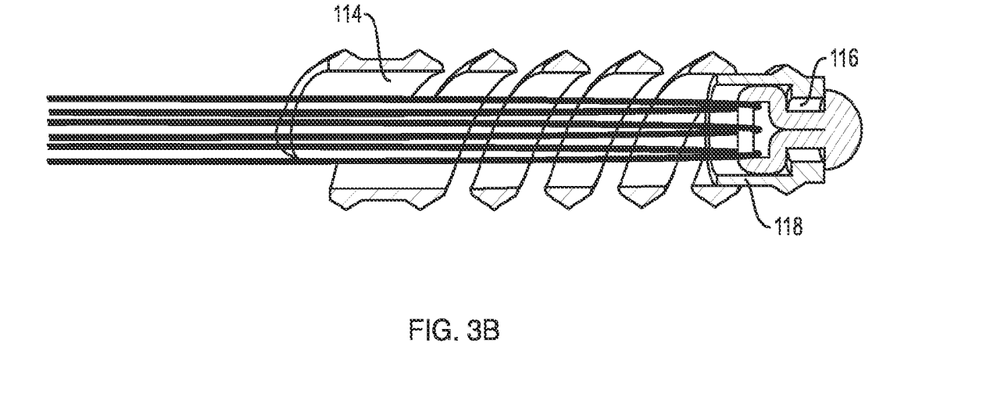

FIGS. 3A and 3B show examples the tissue repair system 100 in cross-sectional views, both with the shaft 122 inserted into the anchor 102 (FIG. 3A), and with the shaft 122 removed from the anchor 102 (FIG. 3B). In examples, the transfer eyelet 105 may comprise a flexible member, such as a suture, having a knot 110 and a loop 112 extending proximally from the knot 110 into the internal volume 114 of the anchor 102. More particularly, the loop 112 extends through a distal opening 116 defined by the support member 118. A size of the opening 116 is selected such that the knot 110 cannot pass through opening 116 into the internal volume 114. One or more repair sutures 130 couple to the loop 112 and extend through the cannulation 124 of the delivery device 120. As shown, the loop 112 remains distal to the distal end 120b of the shaft 122 as the distal end 120b abuts a proximal end of the support member 118.

Figure 4A:
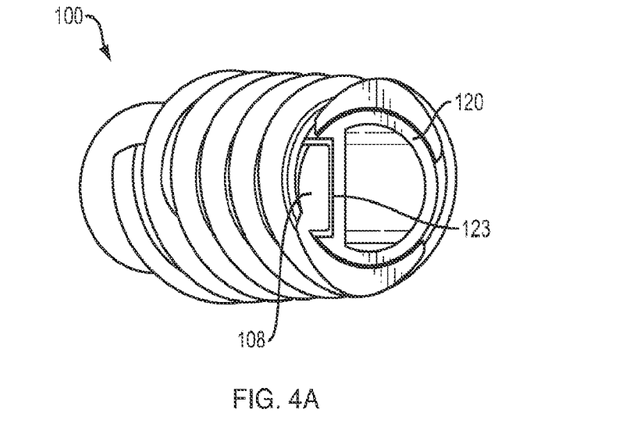
FIGS. 4A-C show cross-sectional views of the tissue repair system of FIG. 1 at a proximal region of the system (FIG. 4A), a central region of the system (FIG. 4B) and a distal region of the system (FIG. 4C)
Figure 4B:
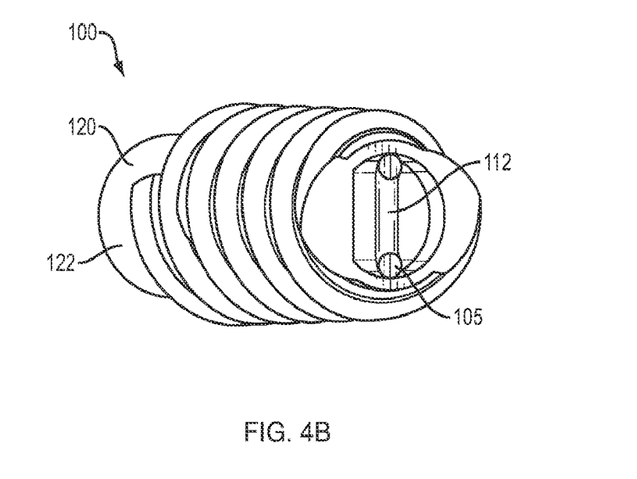
Figure 4C:
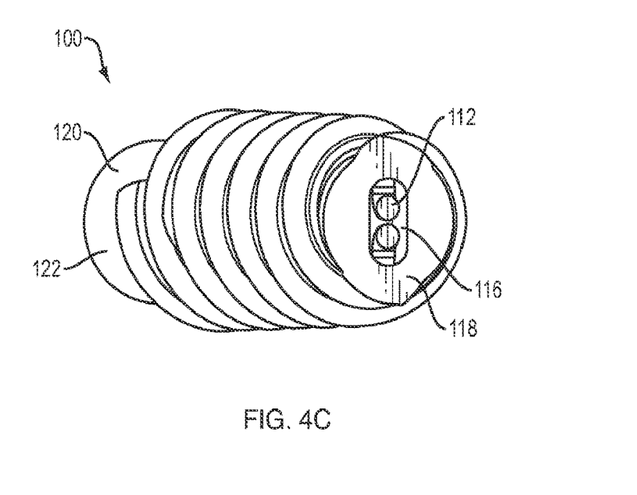

FIGS. 4A-C show additional cross-sectional views of the tissue repair system 100. FIG. 4A shows a cross-sectional view through a more proximal portion of the system 100, including the rib 108 engaged with the groove 123 of the delivery device 120. FIG. 4B shows a cross-sectional view through a more central portion of the system 100, including the entire loop 112 of the transfer eyelet 105 distal to the shaft 122 of the delivery device 120. FIG. 4C shows a cross-sectional view through a more distal portion of the system 100, including the limbs of the loop 112 passing through the opening 116 in the support member 118.

Figure 5A:
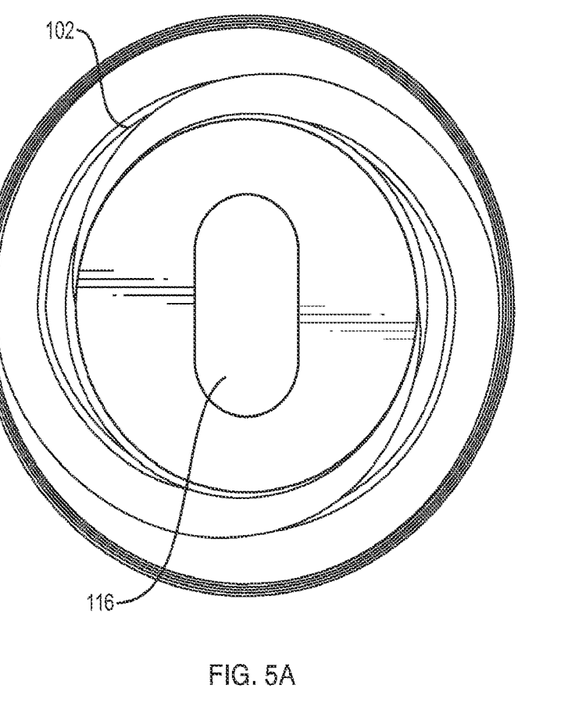
FIGS. 5A and 5B show a distal face of the tissue repair system of FIG. 1 with the transfer eyelet removed (FIG. 5A) and the transfer eyelet inserted (FIG. 5B)
Figure 5B:
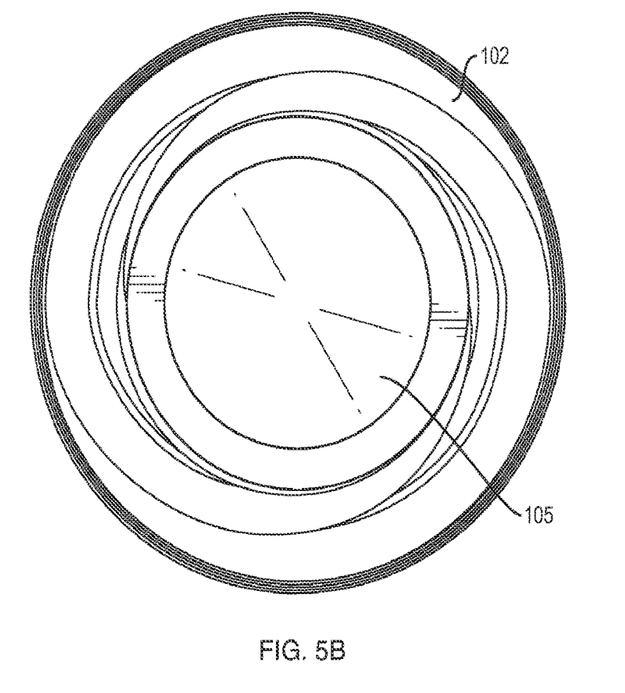

FIGS. 5A and 5B show a distal face of the anchor 102, with the transfer eyelet 105 removed from the opening 116 (FIG. 5A) and the transfer eyelet 105 inserted into the opening 116 (FIG. 5B). In examples, a shape of the opening 116 substantially defines an oval. This oval shape advantageously allows preferential orientation of the repair sutures within the anchor 102 such that the repair sutures align with a non-circular cannulation 124 of the delivery device 120. However, the disclosure also contemplates circular and other convenient shapes of the opening 116.

Advantageously, the use of the distal transfer eyelet 105 and the single rib 108 enable a diameter reduction of the anchor 102 compared to anchors having more than one internal rib. In examples, the anchor 102 can have an outer diameter as small as 3.5 mm. The design also allows maximization of the amount and/or size of the repair suture 130 loadable into the anchor 102. Additionally, the repair sutures 130 need not be folded over when inserted into the anchor 102 through the cannulation 124 of the delivery device 120, as in current tissue repair systems, allowing easier loading of the repair suture 130. The small diameter of the anchor 102 relative to a size of the single rib 108 also allows the anchor 102 to maintain structural integrity during insertion.

Figure 6A:
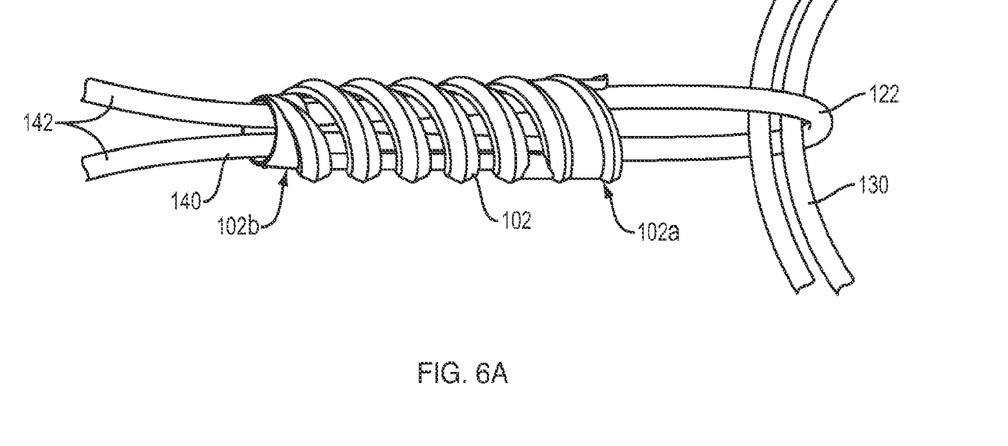
FIGS. 6A and 6B illustrate a method of loading the transfer eyelet and repair suture into the anchor of FIG. 1.
Figure 6B:
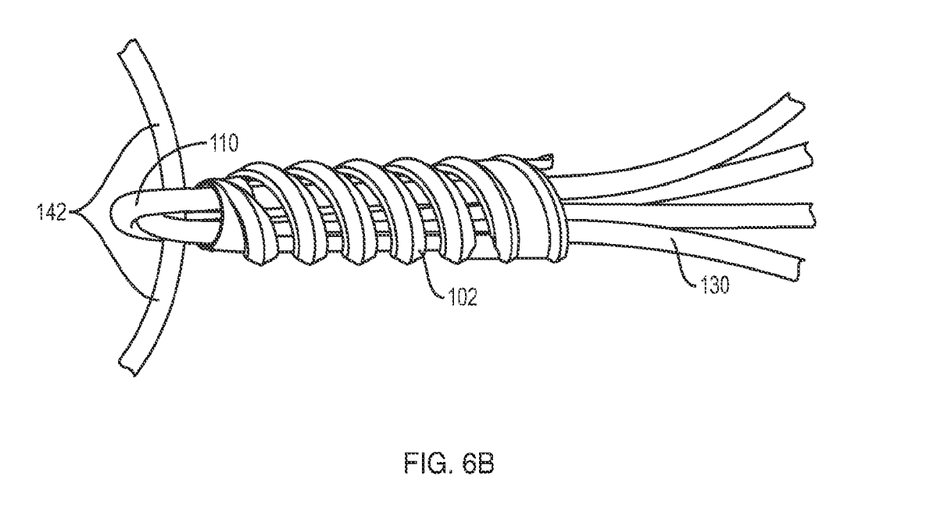

FIGS. 6A and 6B illustrate a method of loading the anchor 102 with repair suture 130 for use in a tissue repair. As shown in FIG. 6A, to form the transfer eyelet 105, a folded-over flexible member 140, such as a #2 suture, is passed through the anchor 102 such that the loop 122 extends from the proximal end 102a and the suture limbs 142 extend from the distal end 102b. Repair sutures 130, which may include sutures, tapes or combinations thereof, are coupled to the loop 122, such as by passing through the looped portion 122. As shown in FIG. 6B, the suture limbs 142 are pulled in a distal direction to draw the loop 122 with the repair sutures 130 into the anchor 102. The knot 110 is tied with the suture limbs 142 and the suture limbs 142 are trimmed (not shown) from the knot 110 before the repair sutures 130 are loaded into the delivery device 120.

Figure 7A:
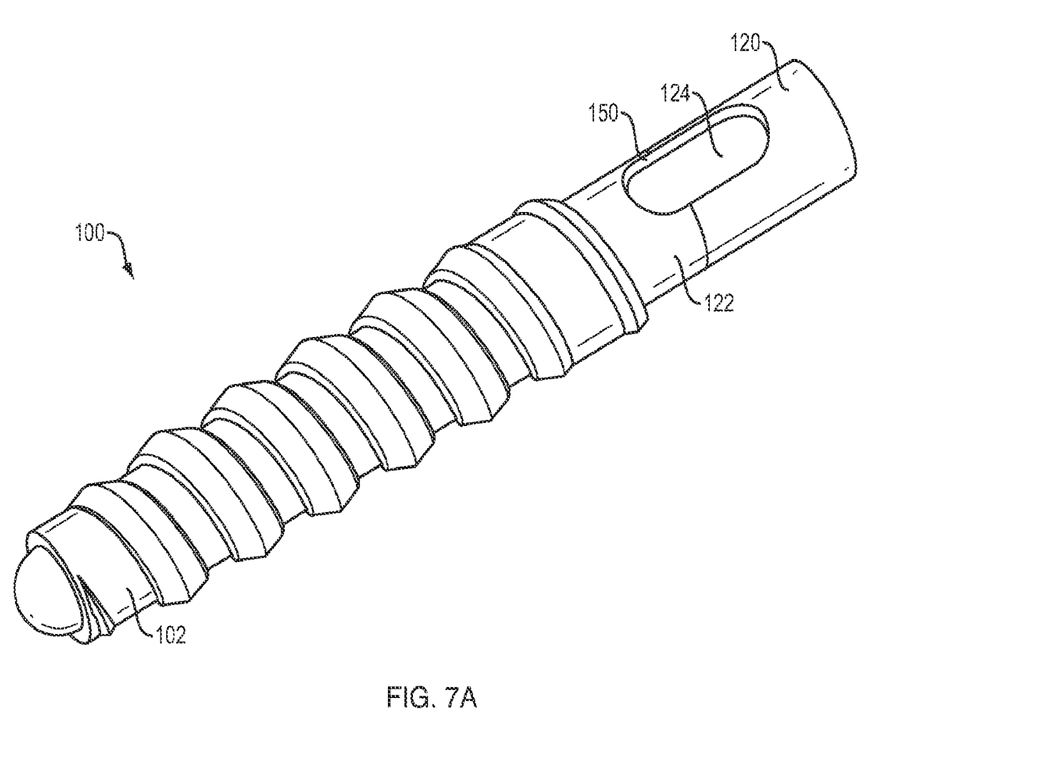
FIGS. 7A-E illustrate a method of loading the repair suture into the delivery device of FIG. 1.
Figure 7B:
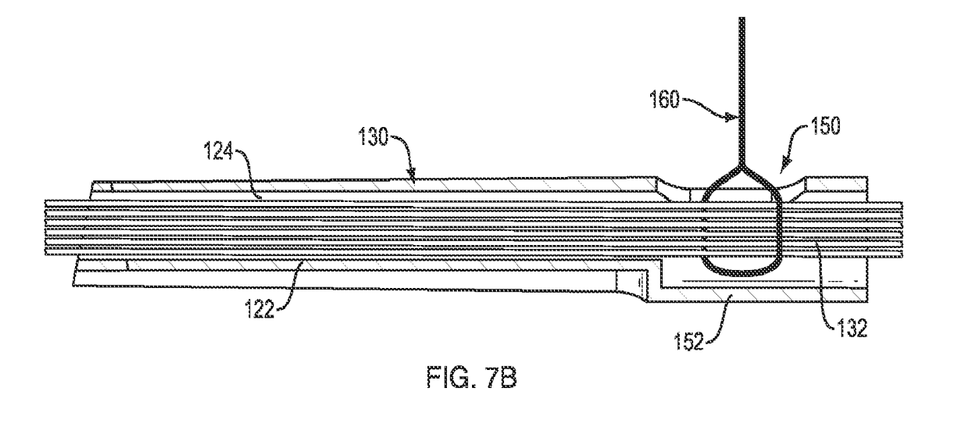
Figure 7C:
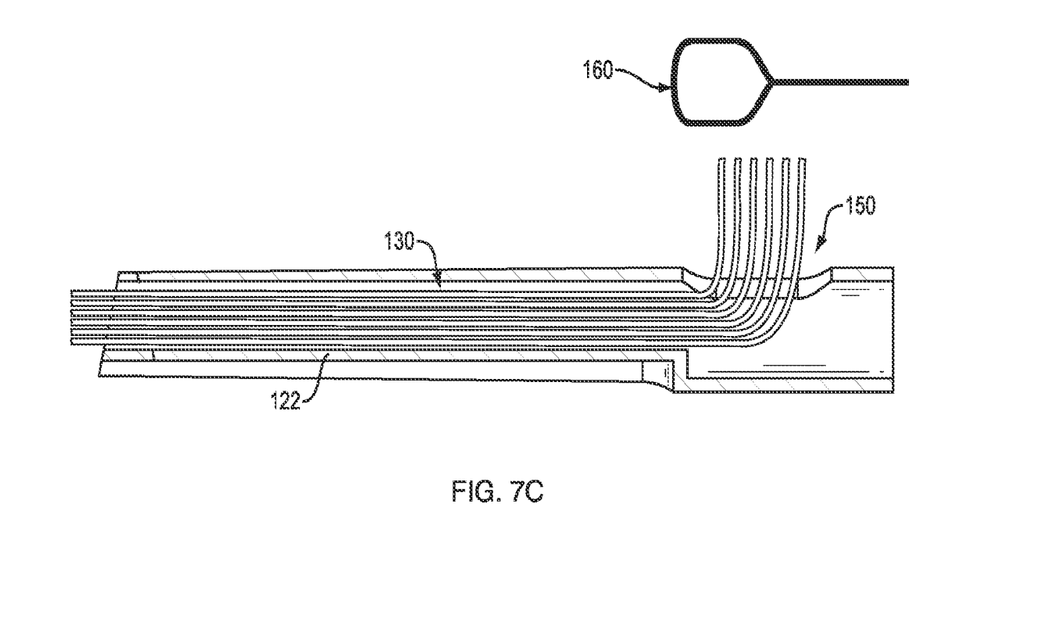

FIGS. 7A-7E illustrate a method of loading the repair sutures 130 into the delivery device 120. FIG. 7A shows the tissue repair system 100 of FIG. 1 rotated to show an aperture 150 defined in an outer surface of the shaft 122 in a region just proximal to the anchor 102. The aperture 150 communicates with the cannulation 124 of the shaft 122. While FIG. 7A shows the aperture 150 having an oval shape, the disclosure contemplates other convenient shapes of the aperture 150. FIG. 7B shows that a diameter of the cannulation 124 can increase proximally from a region 152 of the aperture 150 because the shaft 122 need no longer engage the internal volume of the anchor 102. Before inserting the shaft 122 into the anchor 102, a suture puller 160 or other convenient instrument is inserted into the aperture 150. The repair sutures 130 are loaded into a distal end of the cannulation 124 up to the aperture 150, for example, by hand. To aid the insertion, the repair suture 130 may comprise heat-stiffened ends 132 that allow pushing of the ends 132 into the cannulation 124 and receipt through a loop of the suture puller 160. Preferably, a length of the heat-stiffened ends 132 is at least 20 mm. FIG. 7C shows the suture puller 160 used to pull the repair sutures 130 through the aperture 150 such that the repair sutures 130 are temporarily parked outside of the shaft 122. Although FIG. 7C shows all of the repair sutures 130 parked outside of the shaft 122, only a subset of the repair sutures 130 need to extend through the aperture 150 to fully load the system 100. The disclosure also contemplates that other means, such as a removeable ramp feature, could divert the heat-stiffened ends 132 through the aperture 150. The shaft 122 can then be inserted into the anchor 102.

Figure 7D:
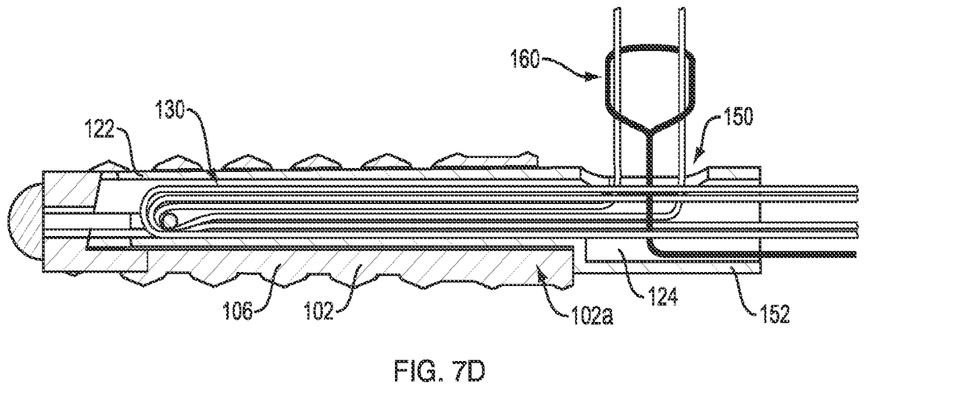
Figure 7E:
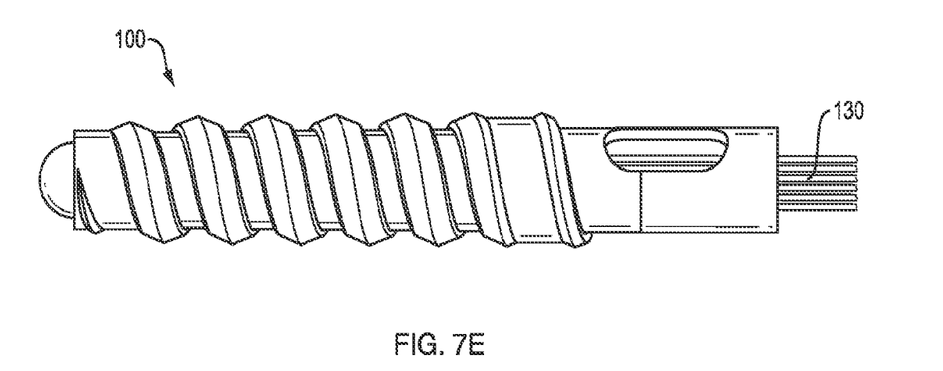

FIG. 7D shows the shaft 122 inserted into the anchor 102 such that the region 152 of the aperture 150 abuts the proximal end 102a of the anchor body 106. The repair sutures 130 can now be passed through the remainder of the cannulation 124 by passing the suture puller 160 or other convenient tool through a proximal end of the cannulation 124 to retrieve the repair sutures 130 back into the cannulation 124, as shown in FIG. 7E. After this step, all repair sutures 130 are fully loaded into the tissue repair system 100, making the tissue repair system 100 ready for use.

Figure 8:
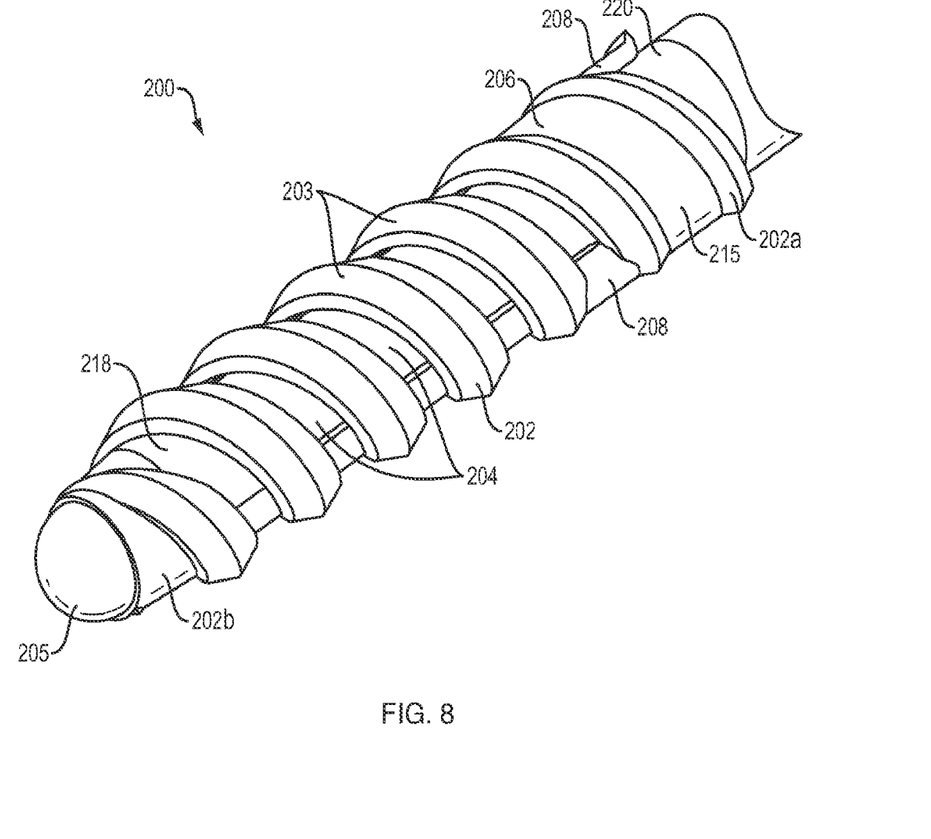
FIG. 8 shows another example of the tissue repair system of this disclosure, including an anchor, a delivery device, and a transfer eyelet, in an assembled view.

FIG. 8 shows another example of a tissue repair system 200 of this disclosure in an assembled view. Tissue repair system 200 is substantially similar to the tissue repair system 100, except as described below. The tissue repair system 200 comprises an anchor 202 having a body 206 including a proximal end 202a and a distal end 202b. Most of the anchor 202 includes a screw thread 203 in the form of an open helical coil—i.e., a connected series of continuous regularly spaced turns of the thread 203 extending in a helical or spiral form substantially from the proximal end 202a to the distal end 202b with apertures 204 defined by the space between the turns of the thread 203. The body 206 of the anchor 202 defines an internal volume communicating with a region exterior to the body 206 through the apertures 204. In examples, webbing 215 may extend between any two adjacent turns of the thread 203, although the disclosure also contemplates anchors 202 without webbing. The distal end 202b also includes a transfer eyelet 205 extending through a support member 218 into the interior volume of the anchor 202. Additionally, a plurality of longitudinally extending ribs 208 extends from the support member 218 along an interior surface of the thread 203, contacting at least two adjacent turns of the thread 203. In the example of FIG. 8, two diametrically opposed ribs 208 extend through the anchor 202. When the anchor 202 couples to the delivery device 220, the ribs 208 engage with a plurality of grooves of the delivery device 220, as further described below. In examples, the anchor 202 may comprise polymers, bioabsorbable materials, metals, or any other suitable material.

Figure 9:
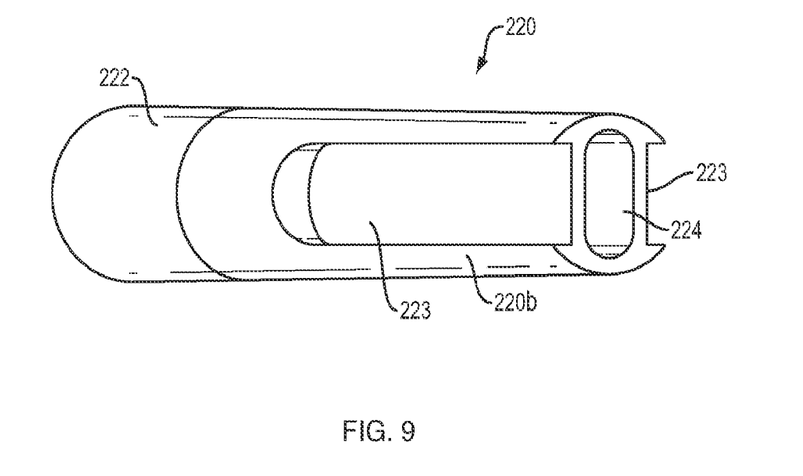
FIG. 9 shows the distal end of a shaft of the delivery device of FIG. 8.

FIG. 9 shows an example of a distal end 220b of a shaft 222 of the delivery device 220. The distal end 220b defines the plurality grooves 223 on an outer surface of the shaft 222. In the example of FIG. 9, the shaft 222 defines two diametrically opposed grooves 223. When inserted into the anchor 202 of FIG. 8, the ribs 208 of the anchor 202 house within the grooves 223. The delivery device 220 defines a cannulation 224 such that when the anchor 202 engages the shaft 222, both the transfer eyelet 205 and repair sutures attached to the transfer eyelet 205 extend through the cannulation 224.

Figure 10A:
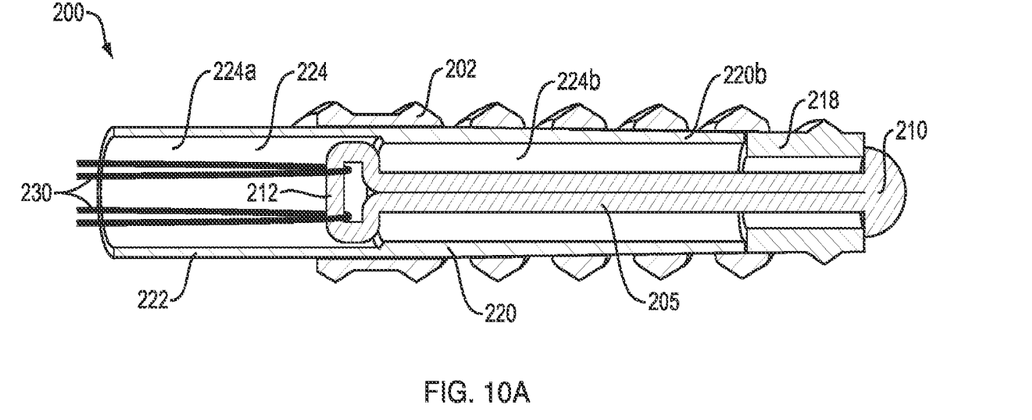
FIGS. 10A and 10B show cross-sectional views of the tissue repair system of FIG. 8 with the shaft inserted (FIG. 10A) and the shaft removed (FIG. 10B)
Figure 10B:
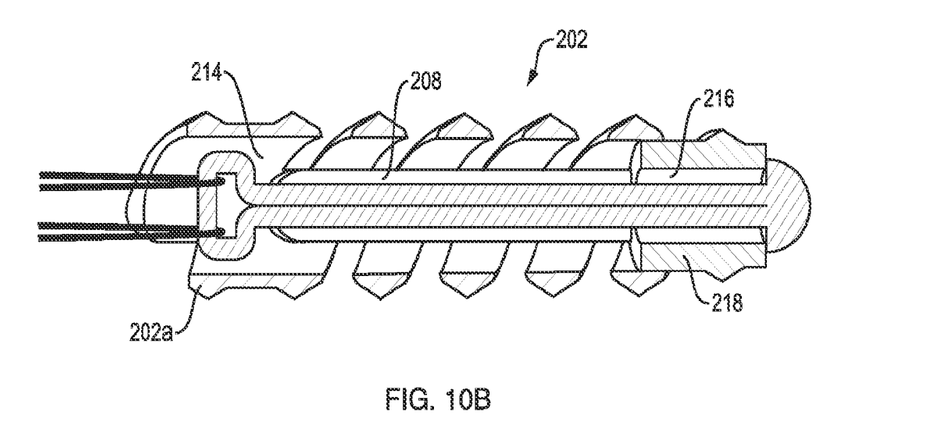

FIGS. 10A and 10B show examples the tissue repair system 200 in cross-sectional views, both with the shaft 222 inserted into the anchor 202 (FIG. 10A), and with the shaft 222 removed from the anchor 202 (FIG. 10B). In examples, the transfer eyelet 205 may comprise a flexible member, such as a suture, having a knot 210 and a loop 212 extending proximally from the knot 210 into the internal volume 214 of the anchor 202. More particularly, the loop 212 extends through a distal opening 216 defined by the support member 218. A size of the opening 216 is selected such that the knot 210 cannot pass through opening 216 into the internal volume 214 of the anchor 202. One or more repair sutures 230 couple to the loop 212 and extend through the cannulation 224 of the delivery device 220. As shown in FIG. 10B, rather than extending an entire length of the anchor 202, the truncated ribs 208 extend proximally from the support member 218 to a region distal to the proximal end 202a of the anchor 202. As such, a proximal portion 224a of the cannulation 224 can have a diameter selected to be wider than a diameter of a distal portion 224b of the cannulation 224 in the region of the shaft 222 where the grooves 223 do not engage the ribs 208. The limbs of the loop 212 extend through the cannulation 224 such that the loop 212 resides in the proximal portion 224a of the cannulation 224 as the distal end 220b of the shaft 222 abuts a proximal end of the support member 218. The smaller diameter of the distal portion 224b further prevents the loop 212 from entering the distal portion 224b. While FIG. 10B illustrates one of two truncated ribs 208, the disclosure also contemplates one fully-extending rib 208 and one truncated rib 208 extending through the anchor 202.

Figure 11A:
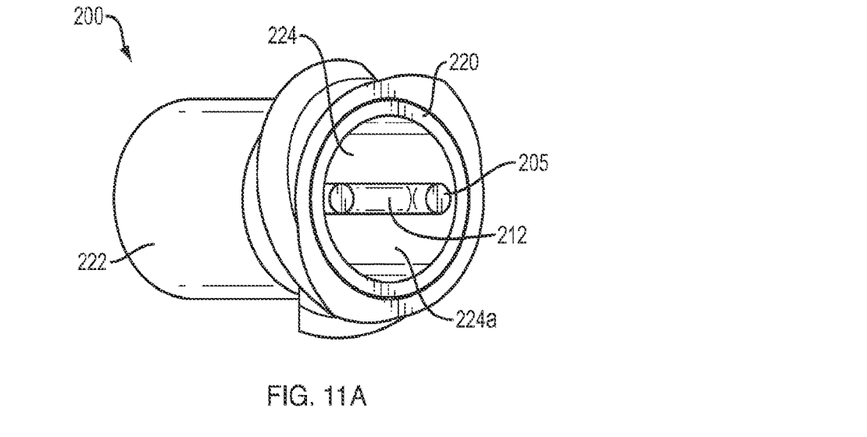
FIGS. 11A-C show cross-sectional views of the tissue repair system of FIG. 8 at a proximal region of the system (FIG. 11A), a central region of the system (FIG. 11B) and a distal region of the system (FIG. 11C).
Figure 11B:
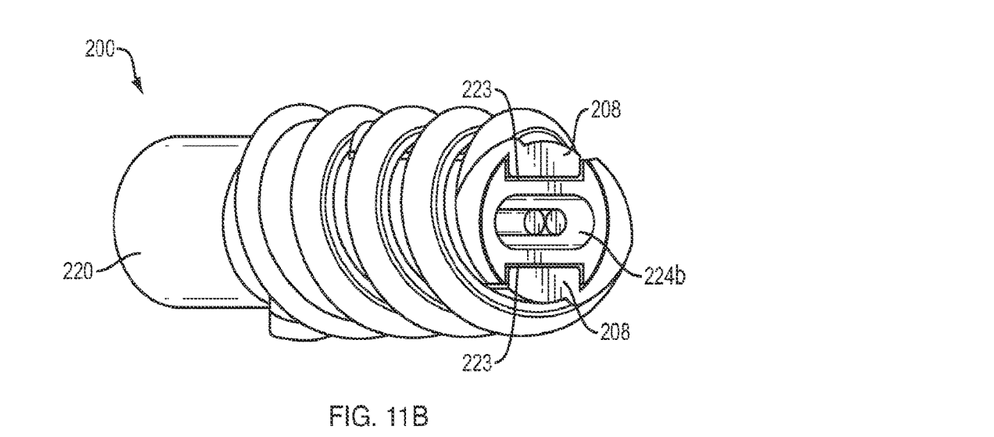
Figure 11C:
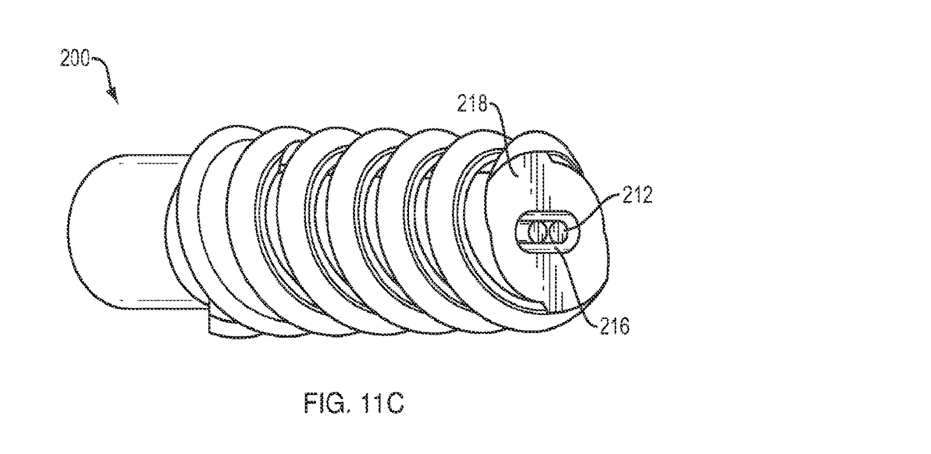

FIGS. 11A-C show additional cross-sectional views of the tissue repair system 200. FIG. 11A shows a cross-sectional view through a more proximal portion of the system 200, including the entire loop 212 of the transfer eyelet 205 in the proximal portion 224a of the cannulation 224. FIG. 11B shows a cross-sectional view through a more central portion of the system 200, including the ribs 208 engaged with the grooves 223 of the delivery device 220. FIG. 11C shows a cross-sectional view through a more distal portion of the system 200, including the limbs of the loop 212 passing through the opening 216 in the support member 218. Like in the tissue repair system 100, the oval shape of the opening 216 advantageously allows preferential orientation of the repair sutures within the anchor 202 such that the repair sutures align with a non-circular cannulation 224 of the distal portion 224b.

Advantageously, the use of the transfer eyelet 205 and the truncated ribs 208 enable a diameter reduction of the anchor 202 compared to anchors having ribs extending an entire length of the anchor. In examples, the anchor 102 can have an outer diameter as small as 3.5 mm. The design also allows maximization of the amount and/or size of the repair suture 230 loadable into the anchor 202. Additionally, the repair sutures 230 need not be folded when inserted into the anchor 202 through the cannulation 224 of the delivery device 220, as in current tissue repair systems, allowing easier loading of repair suture 230 into the tissue repair system 200. The repair suture 230 may be loaded into the tissue repair system 200 in a similar manner as described with regard to FIGS. 6A-6C and 7A-7E.

While the disclosure particularly shows and describes preferred examples, those skilled in the art will understand that various changes in form and details may exist without departing from the spirit and scope of the present application as defined by the appended claims. The scope of this present application intends to cover such variations. As such, the foregoing description of examples of the present application does not intend to limit the full scope conveyed by the appended claims.

The invention claimed is:

1. A tissue repair system comprising:
a driver comprising a shaft including a distal end defining at least one groove, the shaft defining an internal cannulation extending through the shaft, an inner diameter of a proximal portion of the cannulation selected to be larger than an inner diameter of a distal portion of the cannulation; and
an anchor engageable with the distal end of the shaft of the driver, the anchor comprising:
an anchor body including at least one open helical coil defining an internal volume communicating with a region exterior to the at least one open helical coil through a spacing between turns of the at least one open helical coil, the internal volume configured for insertion of the distal end of the shaft of the driver;
a support member disposed within a distal end of the anchor body:
at least one rib extending proximally from the support member within the internal volume, the at least one rib configured to engage the at least one groove of the shaft of the driver; and
a flexible member extending through an opening at the distal end of the anchor body and forming a loop within the interior volume, the loop configured to be disposed in the proximal portion of the cannulation of the shaft when the anchor is engaged with the distal end of the shaft; and
at least one suture coupled to the loop;
wherein the at least one rib extends to a region distal to the loop; and
wherein the opening has an oval shape to align the at least one suture with a non-circular cross section of the distal portion of the cannulation.

2. The tissue repair system of claim 1, wherein the at least one rib is two ribs, and the at least one groove is two grooves.

3. The tissue repair system of claim 1, wherein the at least one rib is connected to at least two turns of at the least one open helical coil.

4. The tissue repair system of claim 1, wherein the proximal portion of the cannulation is configured for passage of the at least one suture.

5. The tissue repair system of claim 4, wherein an outer surface of the shaft defines an aperture in communication with the cannulation such that at least one of the at least one suture is routable through the aperture.

6. The tissue repair system of claim 1, wherein the opening is defined by the support member.

\* \* \* \* \*